United States Patent
Sato

(10) Patent No.: US 9,476,386 B2
(45) Date of Patent: Oct. 25, 2016

(54) INTAKE AND EXHAUST SYSTEM FOR INTERNAL COMBUSTION ENGINE

(71) Applicant: DENSO CORPORATION, Kariya, Aichi-pref. (JP)

(72) Inventor: Osamu Sato, Nagoya (JP)

(73) Assignee: DENSO CORPORATION, Kariya (JP)

(*) Notice: Subject to any disclaimer, the term of this patent is extended or adjusted under 35 U.S.C. 154(b) by 73 days.

(21) Appl. No.: 14/551,369

(22) Filed: Nov. 24, 2014

(65) Prior Publication Data

US 2015/0240751 A1  Aug. 27, 2015

(30) Foreign Application Priority Data

Feb. 27, 2014 (JP) .................................. 2014-36202

(51) Int. Cl.
| | |
|---|---|
| F02M 26/09 | (2016.01) |
| F02M 25/07 | (2006.01) |
| F02B 37/00 | (2006.01) |
| F02B 67/10 | (2006.01) |

(52) U.S. Cl.
CPC .......... *F02M 25/0712* (2013.01); *F02B 37/00* (2013.01); *F02B 67/10* (2013.01); *F02M 26/06* (2016.02); *F02M 26/09* (2016.02); *F02M 26/12* (2016.02); *F02M 26/28* (2016.02); *F05D 2220/40* (2013.01); *F05D 2240/90* (2013.01); *Y02T 10/144* (2013.01)

(58) Field of Classification Search
CPC ....... F02M 26/12; F02B 37/00; F02B 67/10; Y02T 10/121; F05D 2220/40; F05D 2240/90
USPC ................................ 60/599, 602; 123/568.12
See application file for complete search history.

(56) References Cited

U.S. PATENT DOCUMENTS

| | | | | |
|---|---|---|---|---|
| 7,966,979 B2* | 6/2011 | Olsen | ...................... | F01N 13/00 123/195 A |
| 8,770,177 B2* | 7/2014 | Krgo | ...................... | F28F 9/002 123/568.12 |
| 2002/0023630 A1* | 2/2002 | Balekai | ................... | F02B 75/22 123/568.12 |
| 2008/0223329 A1* | 9/2008 | Preimesberger | ........ | F02B 67/10 123/195 A |
| 2008/0257317 A1* | 10/2008 | Cerabone | ................. | F01P 3/12 123/568.12 |
| 2009/0139502 A1* | 6/2009 | Klipfel | .................... | F02M 26/58 123/568.12 |
| 2010/0108041 A1* | 5/2010 | Gruner | ................... | F02M 26/73 123/568.12 |
| 2011/0146638 A1* | 6/2011 | Wada | ................... | F01M 13/022 123/573 |
| 2014/0096752 A1* | 4/2014 | Na | ......................... | F02M 26/18 123/568.12 |
| 2015/0013316 A1* | 1/2015 | Spooner | .................. | F01N 13/00 60/323 |

FOREIGN PATENT DOCUMENTS

| | | |
|---|---|---|
| JP | 2000-248936 A | 9/2000 |
| JP | 2012-057519 A | 3/2012 |

\* cited by examiner

*Primary Examiner* — Nicholas J Weiss
*Assistant Examiner* — Jason T Newton

(57) ABSTRACT

A turbocharger device includes a turbine and a compressor coaxially connected to each other. The turbine is equipped to an exhaust system of an engine. The compressor is equipped to an intake air system of the engine. An EGR device recirculates a part of exhaust gas as EGR gas from a downstream of the turbine to an upstream of the compressor. The EGR device includes an EGR cooler, which is to cool EGR gas, and an EGR valve unit, which is to control a flow of EGR gas according to an opening of an EGR valve. The EGR cooler, the EGR valve unit, and the turbocharger device are screwed to a common bracket and are positioned relative to each other.

6 Claims, 5 Drawing Sheets

INTAKE AND EXHAUST SYSTEM FOR INTERNAL COMBUSTION ENGINE

CROSS REFERENCE TO RELATED APPLICATION

This application is based on reference Japanese Patent Application No. 2014-36202 filed on Feb. 27, 2014, the disclosure of which is incorporated herein by reference.

TECHNICAL FIELD

The present disclosure relates to an intake and exhaust system for an internal combustion engine. The present disclosure may relate to an intake and exhaust system equipped with a turbocharger device and an exhaust gas recirculation (EGR) device.

BACKGROUND

Conventionally, a known EGR device may be employed to recirculate a part of exhaust gas as EGR gas into an intake air passage thereby to reduce nitrogen oxide (NOx) contained in exhaust gas emitted from an engine. For example, Patent Document 1 discloses an EGR device equipped with an EGR cooler to cool EGR gas, which is recirculated into the intake air passage. The EGR cooler is supported with a singular mounting stay, which is connected to an engine main body and is further connected to a part of an intake pipe.

(Patent Document 1)

Publication of unexamined Japanese patent application No. 2000-248936

According to the conventional configuration disclosed in Patent Document 1, the EGR cooler is supported as a singular component via the mounting stay. In addition, the EGR cooler is connected with other components, such as the EGR valve unit, via a flanged pipe. Therefore, the conventional configuration may not restrict relative movement between the EGR cooler and the other components due to oscillation. Consequently, stress may be applied to the flanged pipe to cause cracking and/or breakage in the flanged pipe. Furthermore, the conventional configuration may not absorb displacement caused by difference in thermal expansion between the EGR cooler and the other components. Consequently, the conventional configuration may cause leakage of EGR gas.

Furthermore, according to the conventional configuration, the EGR cooler and the other components are connected with each other via the flanged pipe. Therefore, connection between the EGR cooler and the flanged pipe takes a long time. In addition, the conventional configuration requires bolts screwed to connect flanged pipe. Consequently, the conventional configuration may require high manufacturing cost.

SUMMARY

It is an object to produce an intake and exhaust system for an internal combustion engine configured to restrict relative movement between components.

According to an aspect of the present disclosure, an intake and exhaust system is for an internal combustion engine. The intake and exhaust system comprises a turbocharger device including a turbine and a compressor, which are coaxially connected to each other. The turbine is equipped to an exhaust system of the internal combustion engine. The compressor is equipped to an intake air system of the internal combustion engine. The intake and exhaust system further comprises an EGR device configured to recirculate a part of exhaust gas, which is emitted from the internal combustion engine, as EGR gas from a downstream of the turbine to an upstream of the compressor. The EGR device includes an EGR cooler and an EGR valve unit. The EGR cooler is configured to cool EGR gas. The EGR valve unit is located at a downstream of the EGR cooler relative to a flow of EGR gas and configured to control the flow of EGR gas according to an opening of an EGR valve. The EGR cooler, the EGR valve unit, and the turbocharger device are screwed to a common bracket and are positioned relative to each other.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described in detail.

(First Embodiment)

Figure 1:
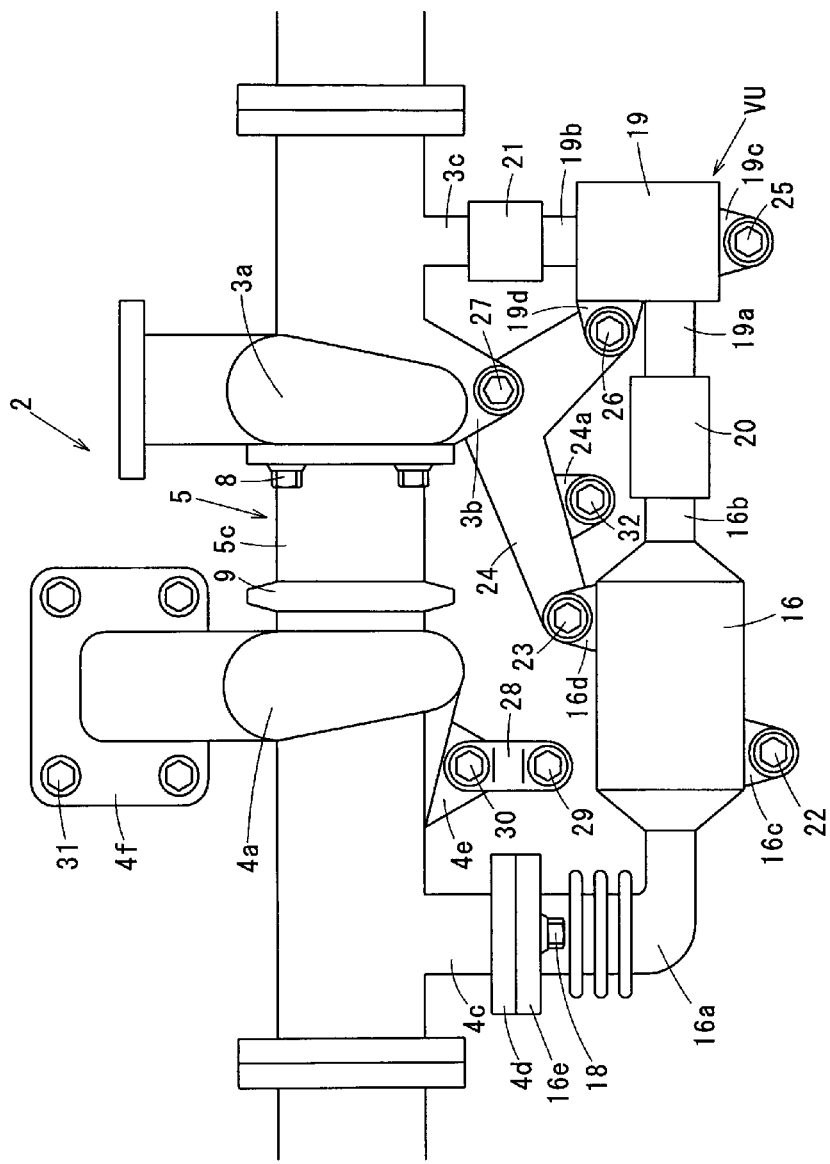
FIG. 1 is an overview showing a mounting configuration between a turbocharger device and an EGR device according to a first embodiment.
Figure 2:
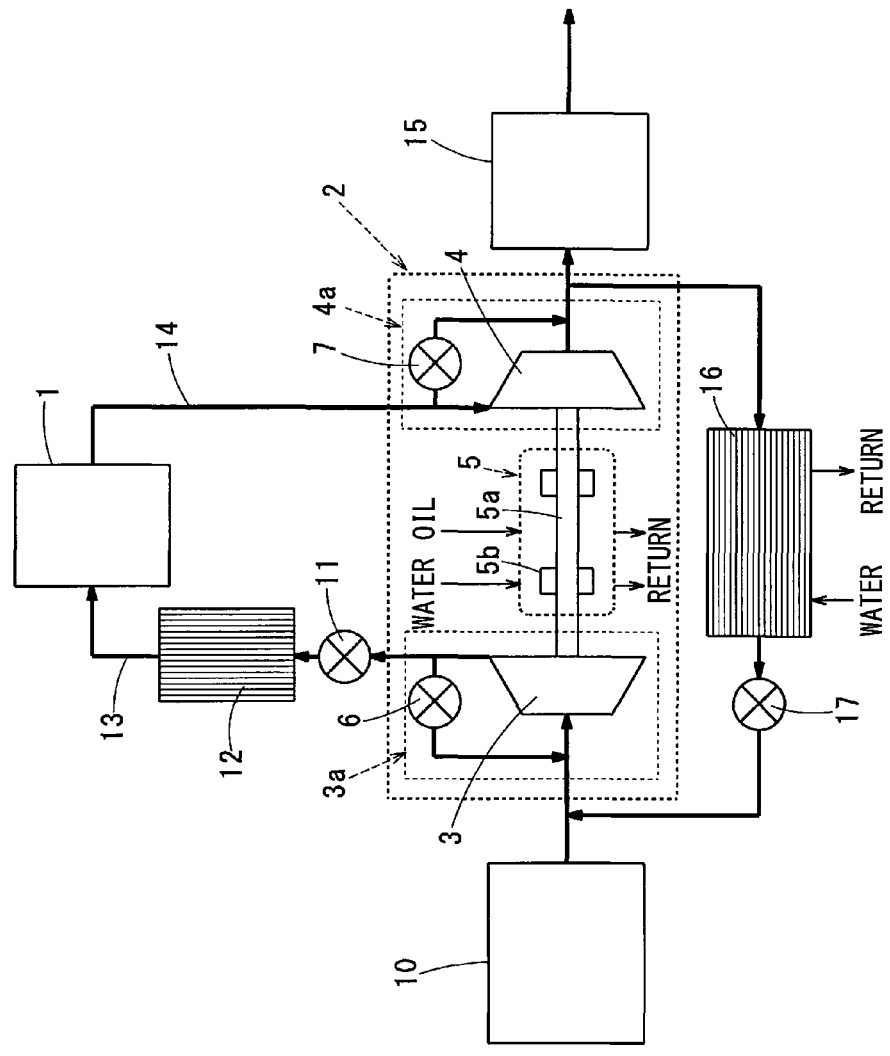
FIG. 2 is a diagram showing an intake and exhaust system for an engine according to the first embodiment.

An internal combustion engine 1 is equipped with an intake and exhaust system including a turbocharger device 2 and an EGR device. As shown in FIG. 2, the turbocharger device 2 includes a compressor 3, a turbine 4, and a bearing unit 5. The compressor 3 is equipped to an intake system of the engine 1. The turbine 4 is equipped to an exhaust system of the engine 1. The bearing unit 5 connects the compressor 3 with the turbine 4. The compressor 3 is accommodated in a compressor housing 3a (FIG. 1), which forms an intake passage. The compressor 3 rotates to compress intake air and supplies the compressed air to the engine 1. The compressor housing 3a is equipped with an air bypass valve 6. The air bypass valve 6 is for restricting air, which is compressed with the compressor 3, from increasing in pressure beyond a predetermined pressure.

The turbine 4 is accommodated in a turbine housing 4a (FIG. 1), which forms an exhaust passage. The turbine 4 rotates on application of pressure of exhaust gas. The turbine housing 4a is equipped with a waste gate valve 7. When exhaust pressure, which is beyond a certain pressure, is applied to the turbine 4, the waste gate valve 7 bypasses the exhaust pressure toward an exhaust side of the turbine 4. The bearing unit 5 includes a shaft 5a and a center housing 5c (FIG. 1). The shaft 5a coaxially connects the turbine 4 with the compressor 3. The center housing 5c rotatably supports the shaft 5a via a bearing 5b. The shaft 5a is integrated with the turbine 4 by, for example, welding. As shown in FIG. 1, the center housing 5c is screwed to the compressor housing 3a by using a bolt 8 and is connected with the turbine housing 4a by using a V-coupling 9. The center housing 5c forms a cooling passage (not shown) through which engine oil or cooling water flows for cooling the shaft 5a.

Referring to FIG. 2, the intake air system of the engine 1 is equipped with an air cleaner 10 at an upstream end relative to an intake air flow. The air cleaner 10 filters intake air. The compressor 3 is equipped to the downstream of the air cleaner 10. A throttle valve 11 and an intercooler 12 are equipped to the downstream of the compressor 3 in this order. The throttle valve 11 controls a quantity of intake air. The intercooler 12 cools air, which is compressed with the compressor 3. Air is cooled through the intercooler 12, and the cooled air is drawn through the intake manifold 13 into the engine 1. In the exhaust system of the engine 1, the turbine 4 is equipped to the downstream of the exhaust manifold 14. A catalytic converter 15 is equipped to the downstream of the turbine 4. The catalytic converter 15 removes toxic substance contained in exhaust gas.

The EGR device draws a part of exhaust gas from the downstream of the turbine 4 and recirculates the part of exhaust gas as EGR gas into intake air on the upstream side of the compressor 3. Referring to FIG. 2, the EGR device includes an EGR cooler 16 and an EGR valve 17. The EGR cooler 16 conducts heat exchange between EGR gas and cooling water to cool EGR gas. The EGR valve 17 controls a flow quantity of EGR gas recirculated to an intake side of the engine 1. Referring to FIG. 1, the EGR cooler 16 is equipped with a flexible (bendable) pipe 16a on an inlet side at the upstream of EGR gas flow. The EGR cooler 16 is connected with the downstream of the turbine housing 4a relative to exhaust gas flow through the flexible pipe 16a. A branch pipe 4c is equipped to the downstream of the turbine housing 4a relative to exhaust gas flow. EGR gas flows into the branch pipe 4c. A flange 4d is equipped to the branch pipe 4c. A flange 16e is equipped to the flexible pipe 16a. The flange 4d and the flange 16e are screwed together by using a bolt 18.

The EGR valve 17, a valve actuating unit (not shown) for driving the EGR valve 17, and/or the like are accommodated in a valve housing 19 to form an EGR valve unit VU (FIG. 1). The EGR valve unit VU is equipped to an intake air side of the EGR cooler 16. That is, the EGR valve unit VU is equipped to the downstream of the EGR cooler 16 relative to EGR-gas flow. Hereafter, the upstream relative to EGR gas flow is referred to as an exhaust gas side, and the downstream relative to EGR gas flow is referred to as an intake air side. The EGR valve unit VU is connected with an inlet pipe 19a, an outlet pipe 16b, and an EGR pipe 20. The inlet pipe 19a is equipped on the exhaust gas side of the valve housing 19. The outlet pipe 16b is equipped on the intake air side of the EGR cooler 16. An outlet pipe 19b is equipped to the intake air side of the valve housing 19. A branch pipe 3c is equipped to the upstream of the compressor housing 3a on the intake air side. The EGR pipe 21 connects the outlet pipe 19b with the branch pipe 3c.

Subsequently, a mounting configuration among the EGR cooler 16, the EGR valve unit VU, and the turbocharger device 2 will be described with reference to FIG. 1. The EGR cooler 16 is equipped with mounting stays 16c and 16d. One mounting stay 16c is screwed to an engine block by using a bolt 22. The other mounting stay 16d is screwed to a bracket 24 by using a bolt 23. The valve housing 19 of the EGR valve unit VU is equipped with mounting stays 19c and 19d. One mounting stay 19c is screwed to the engine block by using a bolt 25. The other mounting stay 19d is screwed to the bracket 24 by using a bolt 26.

The compressor housing 3a is equipped with a mounting stay 3b. The turbine housing 4a is equipped with a mounting stay 4e. The turbocharger device 2 is affixed to the bracket 24 by screwing a bolt 27 to the mounting stay 3b. The turbocharger device 2 is further affixed to the engine block via a turbo stay 28 by screwing a bolt 29 to the mounting stay 4e. The mounting stay 4e and the turbo stay 28 are affixed to each other by screwing a bolt 30. The turbine housing 4a is equipped with a flange 4f. The flange 4f is affixed to a cylinder head of the engine 1 by screwing two or more bolts 31. The bracket 24 is formed of a metallic material, such as aluminum or stainless steel. The bracket 24 is integrated with a mounting stay 24a. The bracket 24 is affixed to an engine block via the mounting stay 24a by screwing a bolt 32.

(Effect of First Embodiment)

According to the first embodiment, the EGR cooler 16, the EGR valve unit VU, and the turbine housing 4a are screwed commonly to the bracket 24 as a common bracket. Therefore, the present configuration may enable to restrict relative movement among components, such as the EGR cooler 16, the EGR valve unit VU, the turbocharger device 2, due to oscillation. More specifically, the bracket 24 may function to regulate relative movement between the EGR cooler 16 and the EGR valve unit VU, relative movement between the EGR valve unit VU and the compressor housing 3a, and relative movement between the EGR cooler 16 and the compressor housing 3a. The present configuration may enable to avoid application of intense stress on the EGR pipe 20, which connects the EGR cooler 16 with the EGR valve unit VU, and the EGR pipe 21, which connects the EGR valve unit VU with the compressor housing 3a. The present configuration may protect the EGR pipes 20 and 21 from cracking and breakage. Therefore, the present configuration may avoid leakage of EGR gas.

The present configuration may enable to restrict relative movement between the components. Therefore, the EGR pipes 20 and 21 need not be elongated. In other words, the present configuration may enable to reduce the length of the EGR pipe 20 and/or the EGR pipe 21, and therefore, the reduction in the pipe length may reduce pressure loss. The EGR pipes 20 and 21 employs not the configuration, which is disclosed in Patent Document 1 to affix flanged pipes to each other by screwing a bolt, but the present configuration, which is to fit the pipe(s) to the outer circumferential periphery of the counter pipe. That is, the present configuration may omit the conventional flanged configuration. Therefore, the present configuration may enable to omit a screw bolt and to omit a screwing process of the screw bolt, thereby to enable cost reduction. In addition, according to the present configuration, the bracket 24 is affixed to the engine block of the engine 1 by screwing the mounting stay 24a, thereby to regulate relative movement with the engine 1. Therefore, the present configuration may enhance a vibration proof property of the device. Furthermore, according to the present configuration of the turbocharger device 2, the compressor housing 3a is connected with the EGR valve unit VU via the EGR pipe 21, and the compressor housing 3a is screwed to the bracket 24. Therefore, the present configuration may enable to support the entire structure further rigidly against vibration, compared with a configuration in which the turbine housing 4a is screwed to the bracket 24.

As follows, another embodiment according to the disclosure will be described.

(Second Embodiment)

Figure 3:
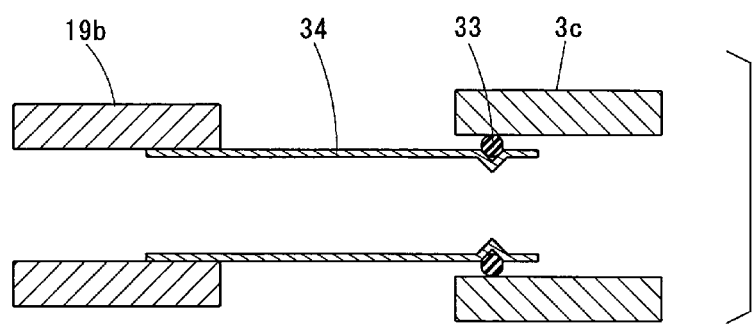
FIG. 3 is a schematic view showing an elastic support configuration between components according to one example of a second embodiment.
Figure 4:
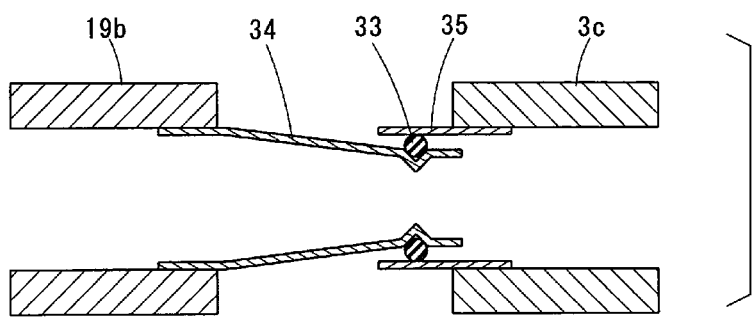
FIG. 4 is a schematic view showing an elastic support configuration between components according to another one example of the second embodiment.
Figure 5:
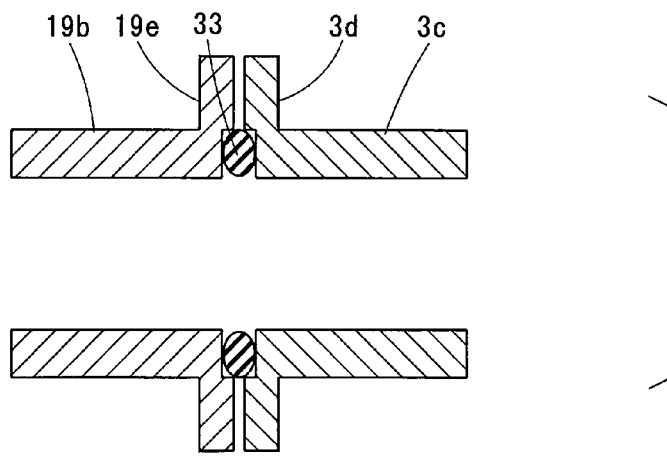
FIG. 5 is a schematic view showing an elastic support configuration between components according to another one example of the second embodiment.

The present second embodiment employs a configuration to employ an elastic suspension configuration at a connection between the EGR cooler 16 and the EGR valve unit VU and at a connection between the EGR valve unit VU and the compressor housing 3a. For example, the outlet pipe 19b of the EGR valve unit VU and the branch pipe 3c of the compressor housing 3a are connected with each other via an O-ring 33 as shown in FIG. 3 to FIG. 5. The O-ring 33 is formed of rubber.

According to the example shown in FIG. 3, a metallic connection sleeve 34 is mounted to the outlet pipe 19b of the EGR valve unit VU. In addition, the O-ring 33 is equipped to the outer circumferential periphery of the connection sleeve 34. In addition, the branch pipe 3c of the compressor housing 3a is fitted to the outer circumferential periphery of the connection sleeve 34 via the O-ring 33. According to the example shown in FIG. 4, similarly to the outlet pipe 19b of the EGR valve unit VU, a connection sleeve 35 is mounted additionally to the branch pipe 3c of the compressor housing 3a. In addition, the connection sleeve 35 is fitted to the outer circumferential periphery of the connection sleeve 34 via the O-ring 33. Thus, the branch pipe 3c is connected to the outlet pipe 19b. According to the example shown in FIG. 5, a flange portion 19e is equipped to the outlet pipe 19b of the EGR valve unit VU. In addition, a flange portion 3b is equipped to the branch pipe 3c of the compressor housing 3a. The O-ring 33 is interposed between the flange portion 19e and the flange portion 3b. In this way, the flange portion 19e and the flange portion 3b are connected to each other. According to the present disclosure, both the EGR valve unit VU and the compressor housing 3a are screwed to the common bracket 24 thereby to regulate relative movement therebetween. Therefore, the flange portion 19e and the flange portion 3b need not be screwed to each other by using, for example, a bolt.

Figure 6:
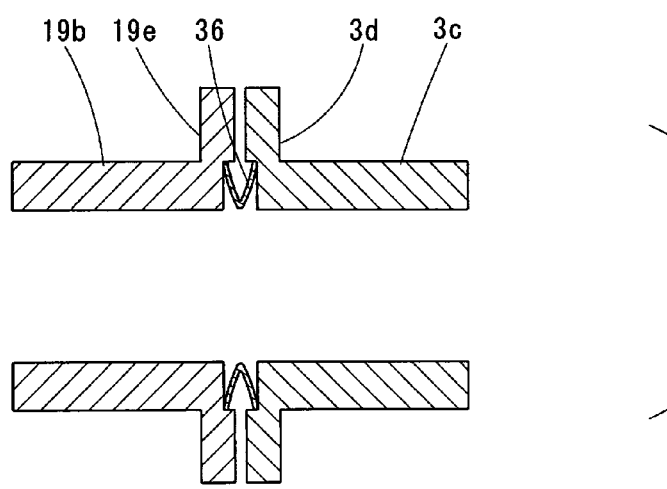
FIG. 6 is a schematic view showing an elastic support configuration between components according to another one example of the second embodiment.
Figure 7:
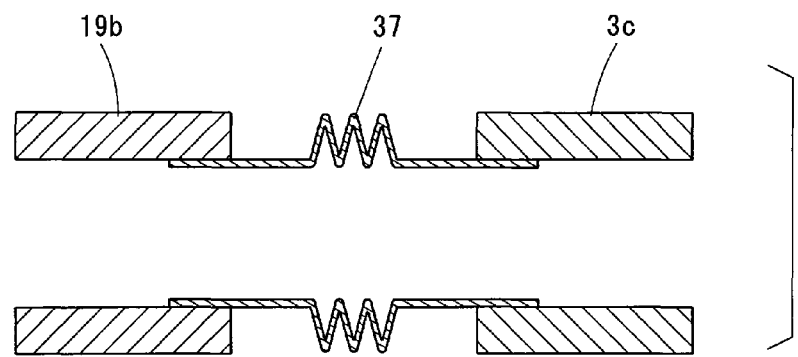
FIG. 7 is a schematic view showing an elastic support configuration between components according to another one example of the second embodiment.
Figure 8:
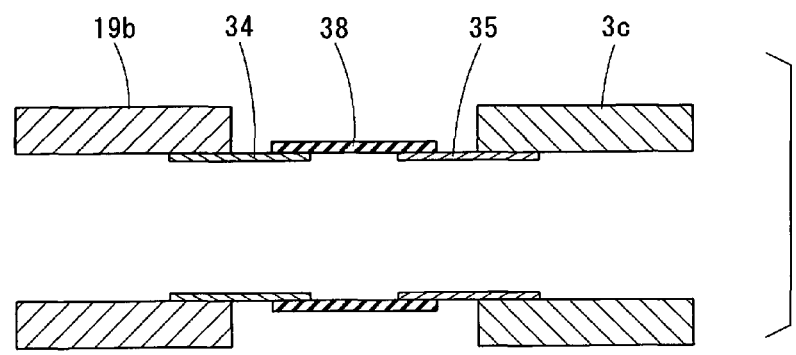
FIG. 8 is a schematic view showing an elastic support configuration between components according to another one example of the second embodiment.

FIG. 6 to FIG. 8 show examples of elastic support configurations other than the O-ring. The example shown in FIG. 6 employs a spring member 36 instead of the O-ring 33 exemplified in FIG. 5. The spring member 36 is interposed between the flange portion 19e, which is equipped to the outlet pipe 19b of the EGR valve unit VU, and the flange portion 3b, which is equipped to the branch pipe 3c of the compressor housing 3a. In this way, the flange portion 19e and the flange portion 3b are connected to each other. The example shown in FIG. 7 employs a flexible pipe 37 to connect the outlet pipe 19b of the EGR valve unit VU with the branch pipe 3c of the compressor housing 3a. The example shown in FIG. 8 employs a flexible (bendable) hose 38 to connect the connection sleeve 34, which is mounted to the outlet pipe 19b of the EGR valve unit VU, and the connection sleeve 35, which is mounted to the branch pipe 3c of the compressor housing 3a.

In each of the examples shown in FIG. 3 to FIG. 8 employs the elastic support configuration to absorb displacement caused in the joint portion due to difference in thermal expansion between the EGR valve unit VU and the compressor housing 3a. Therefore, the examples may produce an effect to reduce leakage of EGR gas. According to the examples shown in FIG. 3 to FIG. 8, the elastic support configuration according to the disclosure is employed in the joint portion between the outlet pipe 19b of the EGR valve unit VU and the branch pipe 3c of the compressor housing 3a. It is noted that, the elastic support configuration according to the disclosure may be employed in a joint portion between the outlet pipe 16b of the EGR cooler 16 and the inlet pipe 19a of the EGR valve unit VU. The outlet pipe 19b of the EGR valve unit VU may be equivalent to a valve connection port. The branch pipe 3c of the compressor housing 3a may be equivalent to a turbocharger connection port. The outlet pipe 16b of the EGR cooler 16 may be equivalent to a cooler connection port.

According to the present disclosure, the intake and exhaust system for the internal combustion engine includes the turbocharger device and the EGR device. The turbocharger device includes the turbine and the compressor, which are coaxially connected with each other. The turbine is equipped to the exhaust system of the internal combustion engine. The compressor is equipped to the intake air system of the internal combustion engine. The EGR device recirculates a part of exhaust gas, which is emitted from the internal combustion engine, as EGR gas from the downstream of the turbine relative to the flow of exhaust gas to the upstream of the compressor relative to the flow of intake air. The EGR device includes the EGR cooler and the EGR valve unit. The EGR cooler is configured to cool EGR gas. The EGR valve unit is located at the downstream of the EGR cooler relative to the flow of EGR gas to control the flow of EGR gas according to the opening of the EGR valve. The EGR cooler and the EGR valve unit are screwed together with the turbocharger device to the common bracket and are positioned relative to each other.

The present configuration may enable to screw the EGR cooler and the EGR valve unit together with the turbocharger device to the common bracket. Therefore, the present configuration may restrict relative movement between components, such as the EGR cooler, the EGR valve unit, and the turbocharger device, caused by oscillation. The present configuration may enable to reduce stress applied to a pipe, which connects the EGR cooler with the EGR valve unit. Therefore, the present configuration may enable to avoid cracking and/or breakage in the pipe and may enable to avoid leakage of gas. The present configuration may enable to regulate relative movement between components. Therefore, the present configuration may not require to elongate the length of a pipe, which connects the components with each other, to absorb relative movement between the components. Consequently, the present configuration may enable to reduce the length of the pipe. Further consequently, the present configuration may enable to reduce pressure loss. In addition, the present configuration may enable to increase a quantity of EGR gas thereby to reduce emission of NOx and to restrain increase in pumping loss caused by recirculation of EGR gas. Thus, the present configuration may enable to reduce fuel consumption. Furthermore, the present configuration may not require a flanged pipe, which is disclosed in a prior art such as Patent Document 1 to connect components with each other and may omit the flanged pipe. Consequently, the present configuration may not require a bolt for connecting the flanged pipes together and may not require a screwing process for the bolt. Thus, the present configuration may enable to reduce a manufacturing cost.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An intake and exhaust system for an internal combustion engine, the intake and exhaust system comprising:
   a turbocharger device including a turbine and a compressor, which are coaxially connected to each other, the turbine equipped to an exhaust system of the internal combustion engine, the compressor equipped to an intake air system of the internal combustion engine; and
   an exhaust gas recirculation (EGR) device recirculating a part of exhaust gas, which is emitted from the internal combustion engine, as EGR gas from a downstream of the turbine to an upstream of the compressor, wherein
   the EGR device includes an EGR cooler and an EGR valve unit,
   the EGR cooler cools EGR gas,
   the EGR valve unit is located at a downstream of the EGR cooler relative to a flow of EGR gas and controls the flow of EGR gas according to an opening of an EGR valve, and
   the EGR cooler, the EGR valve unit, and the turbocharger device are screwed to a single bracket and are positioned relative to each other by the single bracket.

2. The intake and exhaust system according to claim 1, wherein
   the EGR cooler has a cooler connection port,
   the EGR valve unit has a valve connection port,
   the turbocharger device has a turbocharger connection port, and
   one of the cooler connection port, the valve connection port, and the turbocharger connection port is connected with another of the cooler connection port, the valve connection port, and the turbocharger connection port via an elastic member.

3. The intake and exhaust system according to claim 1, wherein
   the EGR cooler has a cooler connection port,
   the EGR valve unit has a valve connection port,
   the turbocharger device has a turbocharger connection port, and
   one of the cooler connection port, the valve connection port, and the Turbocharger connection port is connected with another of the cooler connection port, the valve connection port, and the turbocharger connection port via at least one of a flexible hose and a flexible pipe.

4. The intake and exhaust system according to claim 1, wherein the bracket is screwed to the internal combustion engine.

5. The intake and exhaust system according to claim 1, wherein
   the turbocharger device includes a compressor housing accommodating the compressor, and
   the compressor housing is screwed to the single bracket.

6. The intake and exhaust system according to claim 1, wherein
   the single bracket has a first screw part, which the EGR cooler is screwed to, a second screw part, which the EGR valve unit is screwed to, and a third screw part, which the turbocharger device is screwed to, an one body.

* * * * *